Jan. 26, 1932. T. H. THOMAS 1,842,484
FLUID PRESSURE BRAKE
Original Filed Nov. 16, 1929
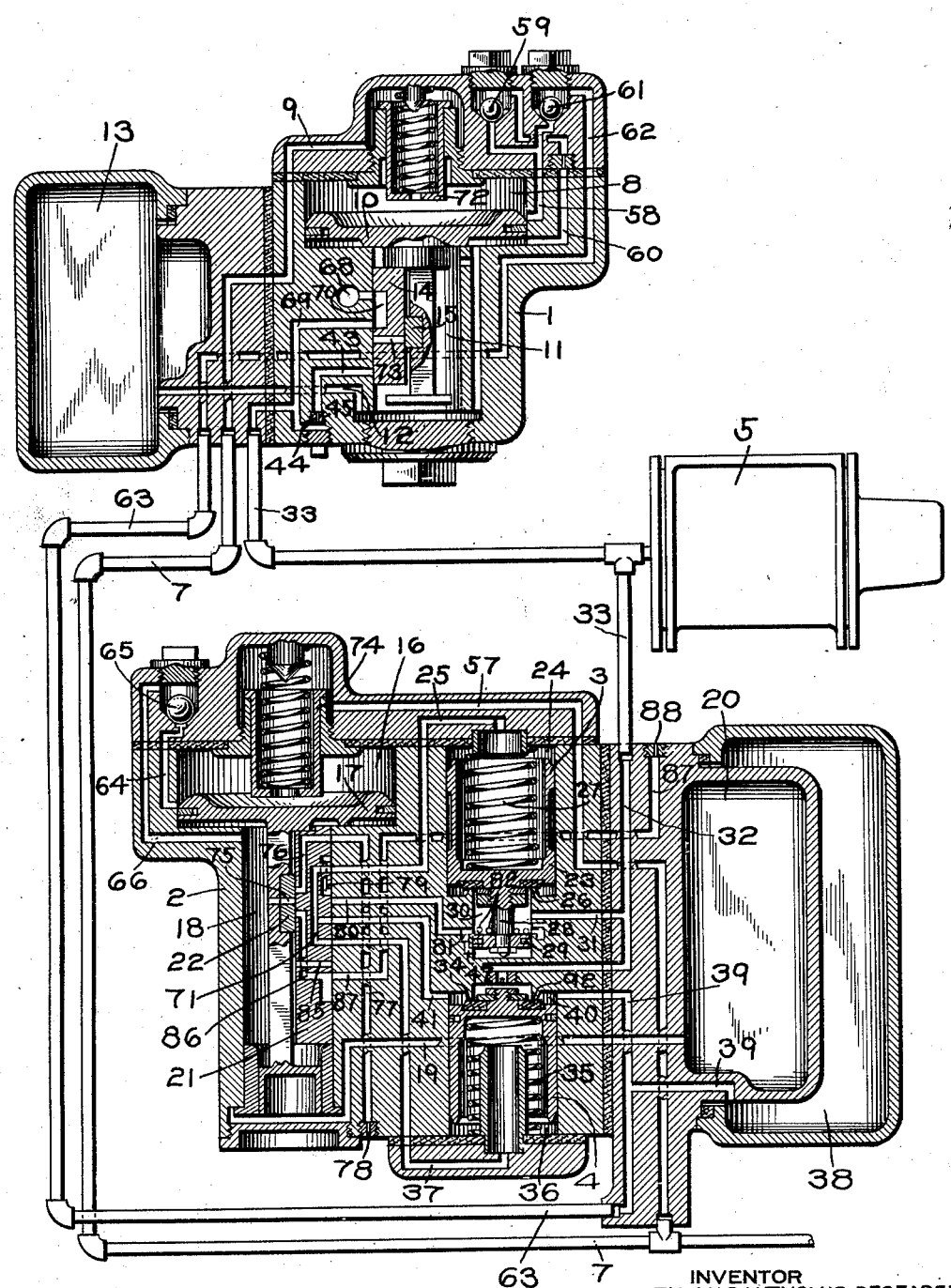
INVENTOR
THOMAS H. THOMAS DECEASED
MABLE M. THOMAS, EXECUTRIX,
BY
ATTORNEY Patented Jan. 26, 1932

1,842,484

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed November 16, 1929, Serial No. 407,623. Renewed July 14, 1931.

This invention relates to fluid pressure brakes, and more particularly to a brake equipment having means for regulating the rate of build up of brake cylinder pressure during an emergency application of the brakes.

It has heretofore been proposed to provide a fluid pressure brake equipment in which in an emergency application of the brakes, an initial inshot of fluid under pressure is supplied to the brake cylinder, which is sufficient to move the brake cylinder piston out and bring the brake shoes into engagement with the car wheels. This is followed by supplying fluid under pressure to the brake cylinder at a slow rate for a time interval sufficient to permit the brakes to be gradually applied throughout the train. Finally, after the brake cylinder pressure has been gradually built up to a predetermined degree, a final inshot of fluid under pressure is supplied to the brake cylinder, in order to provide the desired high degree of brake cylinder pressure in an emergency application of the brakes. An equipment of the above character is disclosed in the prior patent of C. C. Farmer, No. 1,585,774, issued May 25, 1926.

One object of the invention is to provide an improved and simplified fluid pressure brake equipment of the above character.

Other objects and advantages will appear in the following more detailed description of the invention.

In the accompanying drawing, the single figure is a diagrammatic view, partly in section, of a fluid pressure brake equipment embodying my invention.

As shown in the drawing, the equipment may comprise a triple valve device 1, an emergency valve device 2, an inshot valve device 3, a delay valve device 4, a brake cylinder 5, and a brake pipe 7.

The triple valve device 1, may comprise a casing having a piston chamber 8, connected through passage 9 with brake pipe 7, and containing piston 10, and a valve chamber 11, connected through passage 12 with an auxiliary reservoir 13, and containing a main slide valve 14, and a graduating slide valve 15, adapted to be operated by piston 10.

The emergency valve device 2 may comprise a casing having a piston chamber 16, connected through passage 57 with brake pipe 7 and containing piston 17 and having a valve chamber 18, connected through passage 19 with a quick action chamber 20 and containing a main slide valve 21, and a graduating slide valve 22, adapted to be operated by piston 17.

The inshot valve device 3 comprises a valve piston 23 having the chamber 24 at one side connected to a passage 25 leading to the seat of slide valve 21. The valve piston 23 is adapted in its down position to engage a seat rib 26 and is urged to this position by a coil spring 27. The valve piston 23 carries a stem 28, to which is secured a piston valve 29, and the chamber 30 intermediate the piston valve 29 and the valve piston 23 is connected, through passages 31 and 32 with pipe 33, leading to brake cylinder 5.

The delay valve device 4 comprises a valve piston having a valve seat 92 adapted to engage a seat rib 34 in its up position and said valve piston is urged to its up position by a coil spring 35.

The chamber 36 at the lower face of the valve piston 4 is connected to a passage 37, leading to the seat of slide valve 21. An emergency reservoir 38 is connected through passage 39 with chamber 40 at the upper face of the valve piston 4, and said chamber is also connected to a passage 41, leading to the seat of slide valve 21.

In operation, when the brake pipe 7 is charged with fluid under pressure in the usual manner, fluid flows from the brake pipe through passage 9 to piston chamber 8 of the triple valve device 1 and shifts piston 10 to release position, as shown in the drawing. Fluid then flows from piston chamber 8, through passage 58, past check valve 59, and through passage 60 to valve chamber 11, and from valve chamber 11, through passage 12 to the auxiliary reservoir 13, thus charging the auxiliary reservoir 13, and the valve chamber 11.

Fluid also flows from passage 58, past check valve 61 to passage 62, which is connected through pipe 63 and passage 39 with the emergency reservoir 38, so that the emergency reservoir is charged with fluid under pressure. Fluid under presure flows from the brake pipe 7, through passage 57 to piston chamber 16 of the emergency valve device 2 and shifts the piston 17 to release position, as shown in the drawing.

In release position, fluid flows from piston chamber 16, through passage 64, past check valve 65, to passage 66 and then to valve chamber 18, and from valve vhamber 18, through passage 19 to quick action chamber 20, so that said chambers are charged with fluid at brake pipe pressure.

In the release position of the triple valve device 1, the brake cylinder 5 is connected to the atmosphere, through pipe 33, passage 69, cavity 70 in slide valve 14 and atmospheric exhaust port 68.

With the emergency valve device 2 in release position, chamber 24 at the upper face of the inshot valve piston 23 is supplied with fluid under pressure from the emergency reservoir 38, through passage 39, chamber 40, passage 41, cavity 71 in slide valve 21, and passage 25. Chamber 36 at the lower face of the delay valve piston 4 is also charged with fluid at emergency reservoir pressure, through cavity 71 and passage 37.

Upon making a gradual reduction in brake pipe pressure to effect a service application of the brakes, the triple valve piston 10 is moved to a service position, where the piston engages the spring stop 72 and in which the port 73 in the main slide valve 14 registers with passage 69, said port having been previously uncovered by the preliminary movement of the graduating valve 15. Fluid under pressure is then supplied to the brake cylinder 5 in the usual manner to effect a service application of the brakes.

The gradual reduction in brake pipe pressure on the emergency piston 17 causes said piston to move into engagement with the spring stop 74, in which movement port 75 in the graduating valve 22 registers with port 76 in the slide valve 21.

Port 76 registers with a passage 77 leading to the atmosphere, through a restricted port 78, so that fluid under pressure is vented from the valve chamber 18 and the quick action chamber 20, at the same rate as the brake pipe pressure is reduced. The piston 17 is thus prevented from moving to emergency position, when a gradual reduction in brake pipe pressure is effected.

When the brake pipe pressure is suddenly reduced to effect an emergency application of the brakes, the triple valve piston 10 moves to emergency position, in which position, the slide valve 14 uncovers passage 43, so that fluid under pressure is supplied from the valve chamber 11 and the auxiliary reservoir 13, to the brake cylinder, through a restricted port 44 in choke plug 45. The brake cylinder is thus directly supplied with fluid under pressure at a slow rate from the auxiliary reservoir, during an emergency application of the brakes.

Upon a sudden reduction in brake pipe pressure, the emergency piston 17 moves out to emergency position, overcoming the resistance of the spring stop 74, and slide valve 21 is shifted to a position in which cavity 79 in the slide valve 21 connects passage 25 with exhaust passage 77. Cavity 71 in the slide valve 21 connects passage 41 with passage 80 which is connected to chamber 30, through an annular recess 81, having a plurality of openings 82, leading to said chamber. Fluid under pressure from the emergency reservoir 38 is thus supplied to chamber 30 at a rapid rate, and flows to the brake cylinder 5, through passages 31 and 32.

As above described, fluid under pressure initially, in an emergency application, flows directly from the auxiliary reservoir at a slow rate, and from the emergency reservoir 38 at a rapid rate. The brake cylinder pressure builds up in chamber 30 and also in the chamber below the piston valve 29, which chamber is connected to passage 80, through a by-pass 47. When the brake cylinder pressure acting in chamber 30 on the exposed area of the valve piston 23, has been increased to a predetermined degree, sufficient to overcome the pressure of spring 27, the valve piston 23 will be shifted from its lower seat. The full area of the valve piston being now exposed to brake cylinder pressure, the valve piston 23 will be quickly shifted to its upper seat.

In this position, the piston valve 29 cuts off communication from passage 80 to chamber 30, so that further supply of fluid under pressure from the emergency reservoir 38 to the brake cylinder is prevented, and fluid under pressure is now supplied to the brake cylinder only at a restricted rate from the auxiliary reservoir.

In the emergency position of the slide valve 21, a through port 85 registers with passage 37, so that chamber 36, below the valve piston 4 is connected to valve chamber 18. The valve chamber 18 and the quick action chamber 20 are connected, through a port 86 in slide valve 21 with a passage 87, having communication with the atmosphere, through a restricted port 88, so that fluid under pressure in the valve chamber 18, the quick action chamber 20, and in chamber 36 is slowly vented to the atmosphere at a rate determined by the restricted port 88.

The inner seated area at the upper face of valve piston 4 is subject to brake cylinder pressure, as supplied through passage 32 and to emergency reservoir pressure acting in chamber 40 at the outer area of the valve piston and when the fluid pressure below the valve piston has been reduced to a predetermined degree and the brake cylinder pressure has been increased to a predetermined degree, the fluid pressures acting on the upper face of the valve piston will overcome the reduced fluid pressure acting in chamber 36 and the pressure of spring 35, and the valve piston will be shifted downwardly, so that communication is opened from the emergency reservoir to the brake cylinder, such that a rapid flow of fluid under pressure to the brake cylinder is effected.

It will now be seen that in effecting an emergency application of the brakes, a quick inshot of fluid under pressure is initially supplied from the emergency reservoir to the brake cylinder, while fluid under pressure is flowing at a restricted rate from the auxiliary reservoir to the brake cylinder, the pressure of fluid supplied being sufficient to move the brake cylinder piston (not shown) out and cause the brake shoes (not shown) to engage the wheels.

The flow of fluid under pressure from the emergency reservoir to the brake cylinder is then cut off, so that fluid under pressure only flows from the auxiliary reservoir to the brake cylinder at a restricted rate and for a time interval sufficient to permit the brakes to be gradually applied throughout the train, but not with such force as to cause severe shocks.

Finally, after the brake cylinder pressure has been gradually built up to a predetermined degree, a final inshot of fluid under pressure is supplied from the emergency reservoir to the brake cylinder, in order to apply the brakes with the force desired in an emergency application of the brakes.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, the combination with a brake pipe, auxiliary reservoir, brake cylinder, and an additional source of fluid under pressure, of a service valve device operated upon a gradual reduction in brake pipe pressure for supplying fluid under pressure from the auxiliary reservoir to the brake cylinder, and upon a sudden reduction in brake pipe pressure for supplying fluid under pressure from the auxiliary reservoir to the brake cylinder at a restricted rate and additional unitary valve device operated upon a sudden reduction in brake pipe pressure for supplying fluid under pressure from said additional source to the brake cylinder, said additional valve device being operated upon a predetermined increase in brake cylinder pressure for cutting off the supply of fluid from the additional source to the brake cylinder.

2. In a fluid pressure brake, the combination with a brake pipe, auxiliary reservoir, brake cylinder, and an emergency reservoir normally charged with fluid under pressure, of a triple valve device operated upon a sudden reduction in brake pipe pressure for directly supplying fluid under pressure from the auxiliary reservoir to the brake cylinder at a restricted rate and an additional unitary valve device operated upon a sudden reduction in brake pipe pressure for supplying fluid under pressure from the emergency reservoir to the brake cylinder, said additional valve device being operated upon a predetermined increase in brake cylinder pressure for cutting off the supply of fluid from the emergency reservoir to the brake cylinder.

3. In a fluid pressure brake, the combination with a brake pipe, auxiliary reservoir, brake cylinder, and an emergency reservoir normally charged with fluid under pressure, of a triple valve device operated upon a sudden reduction in brake pipe pressure for directly supplying fluid under pressure from the auxiliary reservoir to the brake cylinder at a restricted rate, an additional unitary valve device operative to open communication for supplying fluid under pressure from the emergency reservoir to the brake cylinder and operative upon a predetermined increase in brake cylinder pressure for cutting off said communication, and an emergency valve device operated upon a sudden reduction in brake pipe pressure for initiating the operation of said additional valve device.

4. In a fluid pressure brake, the combination with a brake pipe, auxiliary reservoir, brake cylinder, and an additional source of fluid under pressure, of a service valve device operated upon a gradual reduction in brake pipe pressure for supplying fluid under pressure from the auxiliary reservoir to the brake cylinder, and upon a sudden reduction in brake pipe pressure for supplying fluid under pressure from the auxiliary reservoir to the brake cylinder at a restricted rate and an additional unitary valve device operated upon a sudden reduction in brake pipe pressure for supplying fluid under pressure from said additional source to the brake cylinder, said additional valve device being operated upon a predetermined increase in brake cylinder pressure for entirely cutting off the supply of fluid from the additional source to the brake cylinder.

In testimony whereof, I have hereunto set my hand.

MABLE M. THOMAS,
*Executrix of the Last Will and Testament of Thomas H. Thomas, deceased.*